US011312252B2

(12) United States Patent
Arai (10) Patent No.: US 11,312,252 B2
(45) Date of Patent: Apr. 26, 2022

(54) CONNECTOR

(71) Applicant: Toyota Jidosha Kabushiki Kaisha, Toyota (JP)

(72) Inventor: Kunihiko Arai, Owariasahi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 240 days.

(21) Appl. No.: 16/390,161

(22) Filed: Apr. 22, 2019

(65) Prior Publication Data

US 2019/0322186 A1 Oct. 24, 2019

(30) Foreign Application Priority Data

Apr. 24, 2018 (JP) .............................. JP2018-082737

(51) Int. Cl.
| | | |
|---|---|---|
| *B60L 53/16* | (2019.01) | |
| *B60L 53/18* | (2019.01) | |
| *H01R 13/502* | (2006.01) | |
| *H01B 7/42* | (2006.01) | |

(Continued)

(52) U.S. Cl.
CPC .............. *B60L 53/16* (2019.02); *B60L 53/18* (2019.02); *B60L 53/302* (2019.02); *H01B 7/423* (2013.01); *H01B 9/00* (2013.01); *H01R 13/502* (2013.01); *B60L 2240/36* (2013.01)

(58) Field of Classification Search
CPC ........ B60L 53/16; B60L 53/18; B60L 53/302; B60L 2240/36; H01R 13/502; H01B 7/423; H01B 9/00
See application file for complete search history.

(56) References Cited

U.S. PATENT DOCUMENTS

| | | |
|---|---|---|
| 2011/0104929 A1 | 5/2011 | Suzuki et al. |
| 2012/0326665 A1* | 12/2012 | Yin ......................... B60L 58/26 320/109 |

(Continued)

FOREIGN PATENT DOCUMENTS

| | | |
|---|---|---|
| JP | H10261534 A | 9/1998 |
| JP | 2010-212151 A | 9/2010 |

(Continued)

*Primary Examiner* — David V Henze-Gongola
(74) *Attorney, Agent, or Firm* — Dinsmore & Shohl LLP (57) ABSTRACT

A connector includes: an outer circumferential wall forming a recessed portion inside thereof, a counterpart connector being to be fitted into the recessed portion; a cylindrical portion provided inside the outer circumferential wall, having an inner circumferential surface, and configured to receive a counterpart terminal of the counterpart connector inside the inner circumferential surface; a terminal having a contact portion arranged inside the inner circumferential surface, the terminal being to be electrically connected to the counterpart terminal when the contact portion contacts the counterpart terminal; and a cooling mechanism having a heat absorption portion and a heat dissipation portion, the heat absorption portion being provided at a position opposite to the contact portion with respect to the inner circumferential surface. The cooling mechanism dissipates heat generated at the contact portion and transferred to the heat absorption portion through the inner circumferential surface, at the heat dissipation portion.

8 Claims, 6 Drawing Sheets

(51) Int. Cl.
*B60L 53/302* (2019.01)
*H01B 9/00* (2006.01)

(56) References Cited

U.S. PATENT DOCUMENTS

| | | | | |
|---|---|---|---|---|
| 2013/0267115 A1* | 10/2013 | Mark | ................. | G06F 1/20 |
| | | | | 439/485 |
| 2013/0298588 A1* | 11/2013 | Jojima | ................. | B60L 1/02 |
| | | | | 62/259.2 |
| 2019/0109409 A1* | 4/2019 | Fuehrer | ................. | H01B 7/423 |
| 2019/0326762 A1* | 10/2019 | Zoon | ................. | B60L 53/302 |

FOREIGN PATENT DOCUMENTS

| | | | |
|---|---|---|---|
| JP | 2011258771 A | 12/2011 | |
| JP | 2017507640 A | 3/2017 | |
| WO | 2015119791 A1 | 8/2015 | |

\* cited by examiner

CONNECTOR

CROSS REFERENCE TO RELATED APPLICATIONS

This nonprovisional application claims priority to Japanese Patent Application No. 2018-082737 filed on Apr. 24, 2018 with the Japan Patent Office, the entire contents of which are hereby incorporated by reference.

BACKGROUND

Field

The present disclosure relates to a connector.

Description of the Background Art

A connector is used, for example, to establish electrical connection between a vehicle-mounted battery and a charger provided outside a vehicle (see Japanese National Patent Publication No. 2017-507640). The vehicle includes a connector called an inlet, and the inlet is electrically connected to the vehicle-mounted battery via an electric wire. The charger includes a cable, and a connector called a charging connector is provided at a tip of the cable. With these connectors being connected, the charger charges the vehicle-mounted battery.

Each connector disclosed in Japanese National Patent Publication No. 2017-507640 includes a frame which holds an electric contact (terminal), and the frame has an interior cavity. A fluid is supplied into the interior cavity of the frame through a cooling duct. Japanese National Patent Publication No. 2017-507640 describes that the frame can serve to orientate the electric contact into its correct position, structurally support the electric contact during use (for example, when inserting or removing the connector from the vehicle), and provide cooling at a point where significant heat is generated.

SUMMARY

The terminal of the connector has a base portion connected to an electric wire, and a contact portion which is a portion for contacting a terminal of a counterpart connector (counterpart terminal). During conduction, the terminal of the connector is likely to generate heat at the contact portion. In the frame disclosed in Japanese National Patent Publication No. 2017-507640, cooling (heat absorption for the terminal) is performed at the position of the base portion provided on the electric wire side of the terminal, by the fluid flowing through the inside of the interior cavity. That is, in the frame disclosed in Japanese National Patent Publication No. 2017-507640, the interior cavity is formed only at a position corresponding to the above base portion of the terminal.

The above base portion of the terminal does not contact the counterpart terminal, and the above base portion of the terminal is apart from the above contact portion by a fixed distance. In the configuration of Japanese National Patent Publication No. 2017-507640, the interior cavity of the frame (the fluid) does not reach a portion of the frame located in the vicinity of the above contact portion. Cooling (heat absorption for the terminal) is performed at the position apart from the above contact portion by a fixed distance, and there is room for improvement in terms of efficiently absorbing and dissipating the heat generated at the above contact portion of the terminal.

An object of the present disclosure is to provide a connector having a configuration capable of suppressing an increase in the temperature of a terminal and peripheral elements thereof, by efficiently absorbing and dissipating heat generated at a contact portion of the terminal.

A connector based on the present disclosure is a connector to be connected to a counterpart connector, including: an outer circumferential wall forming a recessed portion inside thereof, the counterpart connector being to be fitted into the recessed portion; a cylindrical portion provided inside the outer circumferential wall, having an inner circumferential surface, and configured to receive a counterpart terminal of the counterpart connector inside the inner circumferential surface; a terminal having a contact portion arranged inside the inner circumferential surface, the terminal being to be electrically connected to the counterpart terminal when the contact portion contacts the counterpart terminal; and a cooling mechanism having a heat absorption portion and a heat dissipation portion, the heat absorption portion being provided at a position opposite to the contact portion with respect to the inner circumferential surface, the cooling mechanism dissipating heat generated at the contact portion and transferred to the heat absorption portion through the inner circumferential surface, at the heat dissipation portion.

With the above configuration, the heat absorption portion of the cooling mechanism is provided in the vicinity of the contact portion. Accordingly, an increase in the temperature of the terminal and peripheral elements thereof can be effectively suppressed by efficiently absorbing the heat generated at the contact portion of the terminal and dissipating the heat at the heat dissipation portion.

In the above connector, the cooling mechanism may include a heat pipe having a refrigerant sealed therein.

With the above configuration, the heat can be transported efficiently by the refrigerant, when compared with a case where the cooling mechanism is constituted of only a metal member.

In the above connector, the refrigerant may include a gas-liquid two-phase refrigerant, and the heat pipe may have an evaporation portion where the refrigerant evaporates and a condensation portion where the refrigerant condenses, and may transport the heat according to a phase change of the refrigerant.

With the above configuration, the heat can be moved according to the phase change of the refrigerant, even when the heat pipe does not include a motive power source such as a pump for circulating the refrigerant.

In the above connector, the heat pipe may be a loop-type pipe having a first flowing portion which allows the refrigerant to flow from the evaporation portion to the condensation portion, and a second flowing portion which allows the refrigerant to flow from the condensation portion to the evaporation portion without flowing through the first flowing portion.

The above configuration can achieve high-speed circulation of the refrigerant, when compared with that in a so-called single pipe-type heat pipe, and can further effectively suppress an increase in the temperature of the terminal and peripheral elements thereof.

In the above connector, the evaporation portion may be provided at a position apart from the heat absorption portion, and the cooling mechanism may further have a metal heat transfer portion which connects the heat absorption portion and the evaporation portion.

With the above configuration, since the metal heat transfer portion is provided, it can be contemplated to fabricate the cooling mechanism easily and inexpensively.

In the above connector, the cooling mechanism may be constituted of only a metal member.

With the above configuration, it can be contemplated to fabricate the cooling mechanism easily and inexpensively, when compared with the case where the cooling mechanism includes the heat pipe.

In the above connector, the heat dissipation portion may be arranged to contact an electric wire connected to the terminal.

With the above configuration, the electric wire has a heat capacity larger than that of the terminal, and can appropriately perform heat exchange with the heat dissipation portion.

In the above connector, the cooling mechanism may further include a cooling device which cools the heat dissipation portion by an air cooling method or a liquid cooling method.

The above configuration can improve heat dissipation efficiency achieved by the cooling mechanism, and thus can further effectively suppress an increase in the temperature of the terminal and peripheral elements thereof.

The foregoing and other objects, features, aspects and advantages of the present disclosure will become more apparent from the following detailed description of the present disclosure when taken in conjunction with the accompanying drawings.

DETAILED DESCRIPTION

Hereinafter, first to sixth embodiments will be described with reference to the drawings. In the following description, identical or corresponding parts will be designated by the same reference numerals, and redundant description may not be repeated. As described in detail below, in the first to fifth embodiments (FIGS. 1 to 10), an inlet provided on the vehicle side (inlet 7, 7A, 7B, 7C, 7D) corresponds to a "connector", and in the sixth embodiment (FIG. 11, FIG. 12), a charging connector 9A corresponds to a "connector".

First Embodiment (Vehicle 1)

Figure 1:
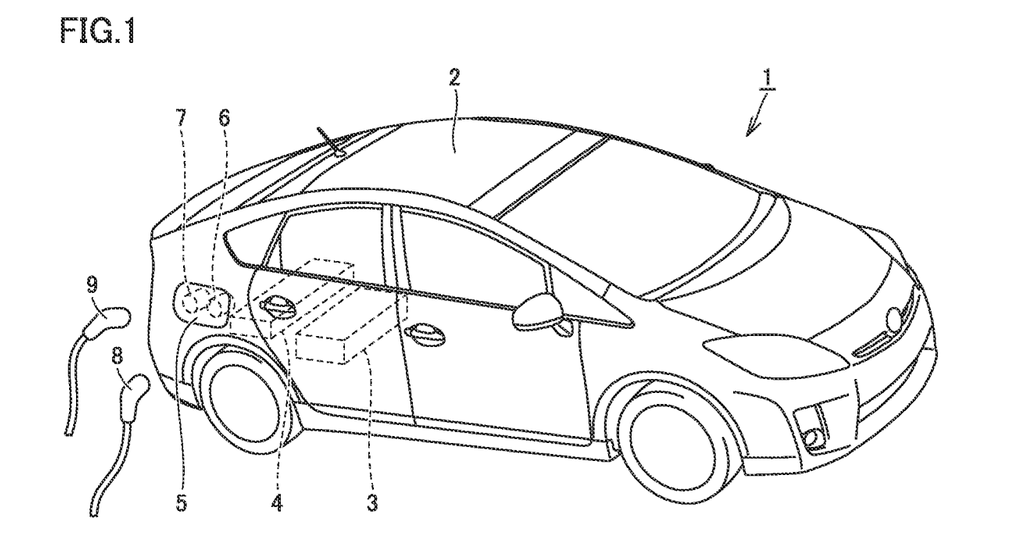
FIG. 1 is a perspective view showing a vehicle 1 in a first embodiment.

As shown in FIG. 1, a vehicle 1 includes a body 2, a fuel tank 3, a vehicle-mounted battery 4, a cover 5, and inlets 6 and 7. Fuel tank 3 and vehicle-mounted battery 4 are mounted within body 2. Cover 5 is provided in a side surface of body 2. An opening is formed in body 2, and cover 5 opens and closes the opening. Inlets 6 and 7 are exposed when cover 5 is opened.

Normal charging is performed on vehicle-mounted battery 4, with a charging connector 8 being connected to inlet 6. Normal charging is charging from a common commercial power source, such as a power source of 100 V or 200 V, for example. Fast charging is performed on vehicle-mounted battery 4, with a charging connector 9 (counterpart connector) being connected to inlet 7 (connector). Fast charging is charging in which electric power of 20 kW, 50 kW, 120 kW, or more is supplied, for example.

(Inlet 7)

Figure 2:
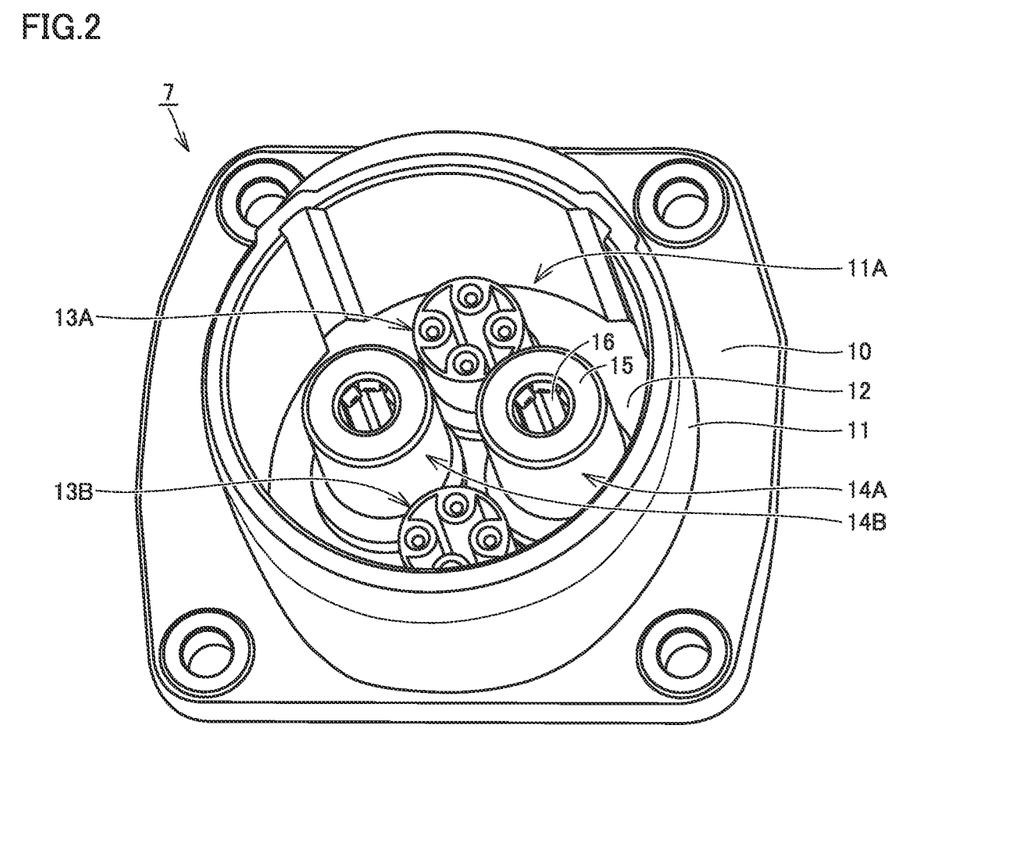
FIG. 2 is a perspective view showing an inlet 7 in the first embodiment.
Figure 3:
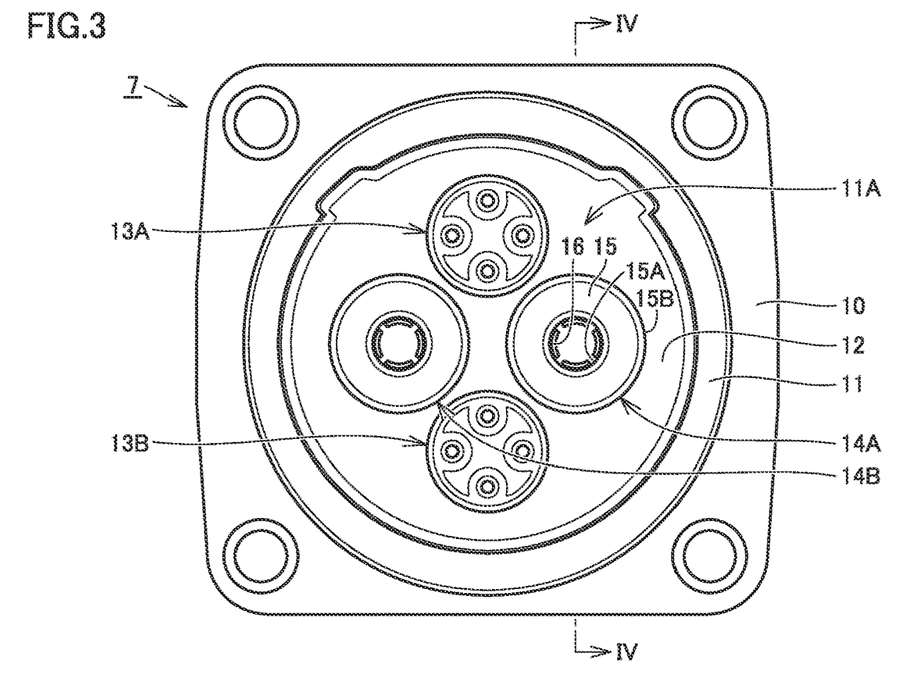
FIG. 3 is a front view showing inlet 7 in the first embodiment.
Figure 4:
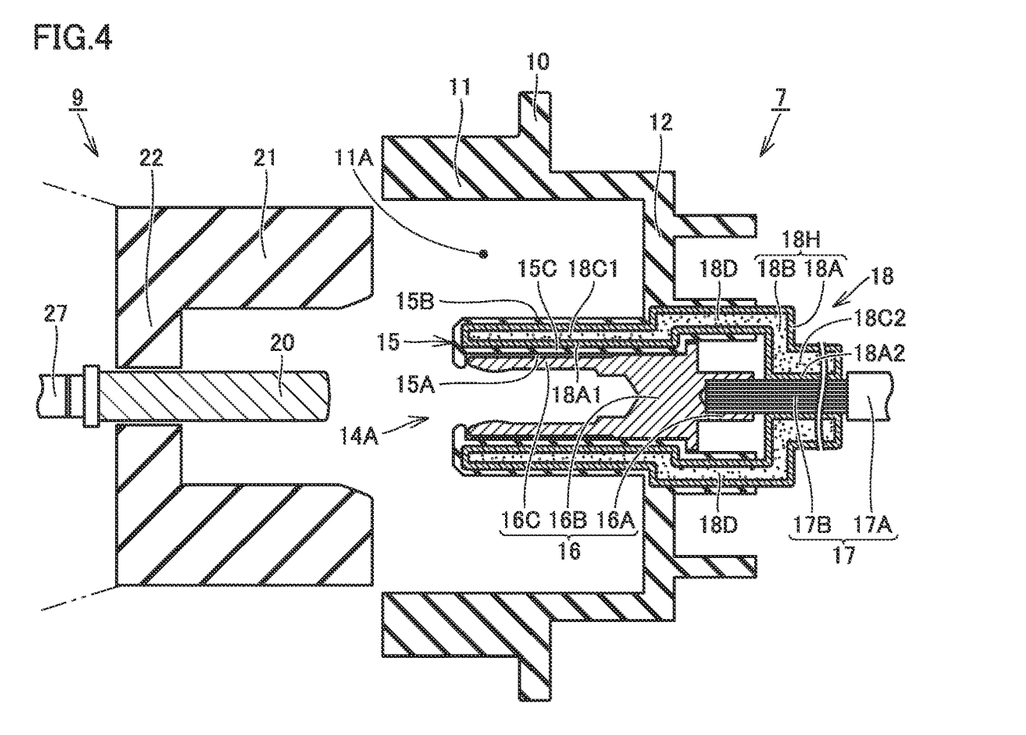
FIG. 4 is a cross sectional view taken along a line IV-IV in FIG. 3 and viewed in a direction indicated by arrows.
Figure 5:
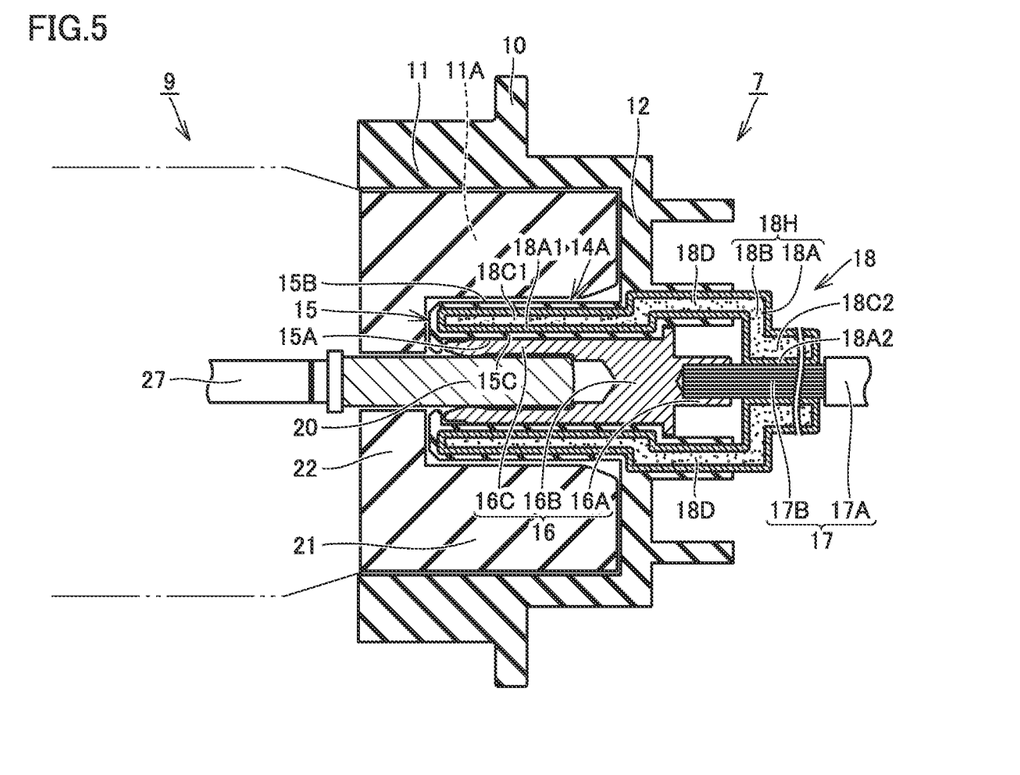
FIG. 5 is a cross sectional view showing a manner in which a charging connector 9 is fitted into inlet 7 in the first embodiment.

FIG. 2 and FIG. 3 are a perspective view and a front view, respectively, showing inlet 7, and FIG. 4 is a cross sectional view taken along a line IV-IV in FIG. 3 and viewed in a direction indicated by arrows. FIG. 5 is a cross sectional view showing a manner in which charging connector 9 is fitted into inlet 7. Referring to FIGS. 2 to 5, inlet 7 includes a base plate 10, an outer circumferential wall 11, a bottom wall 12, signal connection portions 13A and 13B, power connection portions 14A and 14B, and a cooling mechanism 18 (FIG. 4, FIG. 5).

Base plate 10 has a substantially rectangular outer shape, and outer circumferential wall 11 has a cylindrical shape. Outer circumferential wall 11 is provided to penetrate base plate 10, and an end portion of outer circumferential wall 11 on one side (the right side in FIG. 4) is closed by bottom wall 12. Base plate 10, outer circumferential wall 11, and bottom wall 12 may be fabricated by integral molding and constitute a single member, or may be fabricated as members separate from one another and then assembled with one another.

Outer circumferential wall 11 forms a recessed portion 11A inside thereof. Charging connector 9 (FIG. 1, FIG. 4) is to be fitted into recessed portion 11A. Charging connector 9 serving as a counterpart connector has a counterpart terminal 20, an outer circumferential wall 21, and a bottom wall 22, and counterpart terminal 20 is electrically connected to a charger not shown, via an electric wire 27. Outer circumferential wall 21 is to be fitted into a part of recessed portion 11A located outside a cylindrical portion 15 (described later with reference to FIG. 4 and the like), and counterpart terminal 20 is to be inserted inside cylindrical portion 15.

Signal connection portions 13A and 13B and power connection portions 14A and 14B (FIG. 2, FIG. 3) are each provided inside outer circumferential wall 11. Power connection portions 14A and 14B have substantially the same configuration, and power connection portion 14A will be described below. As shown in FIG. 4, power connection portion 14A includes cylindrical portion 15 and a terminal 16.

Cylindrical portion 15 is provided at a position inside outer circumferential wall 11 (FIG. 2, FIG. 3) (more specifically, at a position apart from outer circumferential wall 11), and has an inner circumferential surface 15A and an outer circumferential surface 15B. Cylindrical portion 15 is provided to rise from bottom wall 12, and is configured to have a substantially cylindrical shape (FIG. 4, FIG. 5) to receive counterpart terminal 20 of charging connector 9 inside inner circumferential surface 15A. Cylindrical portion 15 may be formed integrally with bottom wall 12, or may be fabricated as a member separate from bottom wall 12 and then fixed to bottom wall 12.

Terminal 16 has a base portion 16A, a central portion 16B, and a plurality of contact portions 16C. Terminal 16 is electrically connected to vehicle-mounted battery 4 (FIG. 1) via an electric wire 17. A conductor 17B is exposed from a sheath 17A of electric wire 17, and base portion 16A of terminal 16 is connected to conductor 17B such as by a press fit. The plurality of contact portions 16C are provided at a position opposite to base portion 16A with respect to central portion 16B. Central portion 16B supports the plurality of contact portions 16C.

The plurality of contact portions 16C are arranged inside inner circumferential surface 15A of cylindrical portion 15. The plurality of contact portions 16C are each formed as a strip (a long plate), and extend along an axial direction of cylindrical portion 15. The plurality of contact portions 16C have a spacing therebetween, and are arranged side by side along a circumferential direction. Counterpart terminal 20 is inserted into a space surrounded by the plurality of contact portions 16C (FIG. 5). Mechanical mutual contact between terminal 16 (the plurality of contact portions 16C) and counterpart terminal 20 is maintained by cylindrical portion 15.

When charging connector 9 is fitted into inlet 7, contact portions 16C elastically contact counterpart terminal 20 of charging connector 9. The plurality of contact portions 16C are located between inner circumferential surface 15A of cylindrical portion 15 and counterpart terminal 20, and terminal 16 is electrically connected to counterpart terminal 20 when at least one contact portion 16C contacts counterpart terminal 20.

(Cooling Mechanism 18)

As shown in FIG. 4, cooling mechanism 18 has a heat absorption portion 18A1 and a heat dissipation portion 18A2. Heat absorption portion 18A1 is provided within cylindrical portion 15, and is located between inner circumferential surface 15A and outer circumferential surface 15B in a radial direction of cylindrical portion 15. Heat absorption portion 18A1 is provided to be located opposite to contact portions 16C with respect to inner circumferential surface 15A of cylindrical portion 15.

By conduction between counterpart terminal 20 and contact portions 16C, heat is generated at contact portions 16C. The heat is transferred to heat absorption portion 18A1 through inner circumferential surface 15A of cylindrical portion 15. Cooling mechanism 18 transports the heat transferred to heat absorption portion 18A1 to heat dissipation portion 18A2, and dissipates the heat at heat dissipation portion 18A2.

Cooling mechanism 18 in the first embodiment includes a heat pipe 18H having a refrigerant 18B sealed therein. Refrigerant 18B includes a gas-liquid two-phase refrigerant. Heat pipe 18H (more specifically, an enclosed space provided within heat pipe 18H) has an evaporation portion 18C1 where refrigerant 18B evaporates and a condensation portion 18C2 where refrigerant 18B condenses, and transports the heat according to a phase change of refrigerant 18B.

Heat pipe 18H in the first embodiment has a pipe portion 18A and refrigerant 18B. Pipe portion 18A constitutes an outer shell of heat pipe 18H, and is formed from a metal such as copper to be hollow. Pipe portion 18A may be formed from a resin having a high heat conductivity.

Pipe portion 18A has a part embedded within cylindrical portion 15, a part arranged to contact conductor 17B of electric wire 17, and a part connecting between these parts. The part embedded within cylindrical portion 15 has a substantially cylindrical shape as a whole, and an interior space of the embedded part functions as evaporation portion 18C1. Of pipe portion 18A, a part located on a radially inner side of evaporation portion 18C1 constitutes heat absorption portion 18A1 of heat pipe 18H.

Heat absorption portion 18A1 of heat pipe 18H is located opposite to contact portions 16C with respect to inner circumferential surface 15A of cylindrical portion 15 (an inner part 15C of cylindrical portion 15). Inner part 15C of cylindrical portion 15 is present between contact portions 16C of terminal 16 and heat absorption portion 18A1 of heat pipe 18H, and direct contact between contact portions 16C and heat absorption portion 18A1 is prevented by the presence of inner part 15C of cylindrical portion 15. A temperature sensor such as a thermistor may be embedded within inner part 15C of cylindrical portion 15, and charging power and the like may be controlled based on a temperature sensing result.

Of pipe portion 18A, the part arranged to contact conductor 17B of electric wire 17 (contact part) also has a substantially cylindrical shape as a whole. An interior space of the contact part functions as condensation portion 18C2. Of pipe portion 18A, a part located on a radially inner side of condensation portion 18C2 (a part contacting conductor 17B of electric wire 17) constitutes heat dissipation portion 18A2. That is, in the first embodiment, heat dissipation portion 18A2 of cooling mechanism 18 is arranged to contact conductor 17B of electric wire 17 connected to terminal 16.

Of an interior space of pipe portion 18A, a part between evaporation portion 18C1 and condensation portion 18C2 functions as a transportation portion 18D. Refrigerant 18B moves between evaporation portion 18C1 and condensation portion 18C2 via transportation portion 18D. In some embodiments, the transportation portion 18D is provided with a member or processing for efficiently moving refrigerant 18B by the action of a capillary phenomenon, such as a mesh or groove-like wick.

Figure 6:
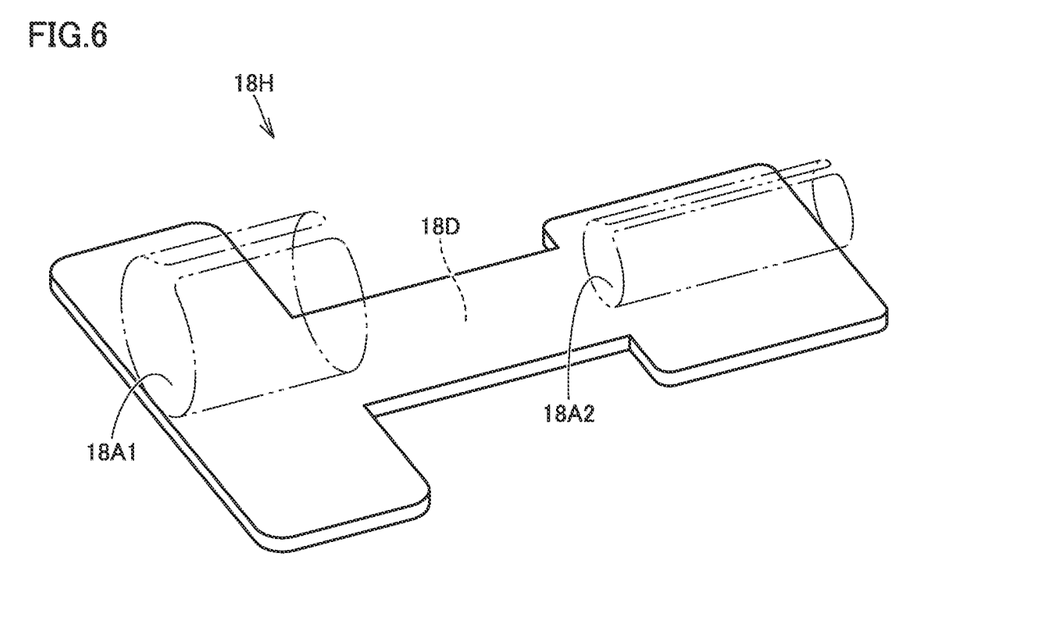
FIG. 6 is a perspective view for illustrating a heat pipe 18H included in inlet 7 in the first embodiment.

As shown in FIG. 6, heat pipe 18H can be formed, for example, by deforming portions of a sheet-like heat pipe to have a cylindrical shape. The sheet-like heat pipe is provided with a cylindrical shape portion forming heat absorption portion 18A1 on an inner surface side (portion corresponding to evaporation portion 18C1), and another cylindrical shape portion forming heat dissipation portion 18A2 on an inner surface side (portion corresponding to condensation portion 18C2). The sheet-like heat pipe has a thickness of 1 mm to 3 mm, for example.

By forming a hollow accommodation portion within cylindrical portion 15 beforehand, heat pipe I 8H can be fitted into the accommodation portion. A portion of heat pipe 18H (portion corresponding to evaporation portion 18C1) may be provided within cylindrical portion 15 by insert molding. Although the above portion of heat pipe 18H (portion corresponding to evaporation portion 18C1) is embedded within cylindrical portion 15 in the first embodiment, the above portion of heat pipe 18H may be exposed to recessed portion 11A on the outer circumferential surface 15B side of cylindrical portion 15. Also with this configuration, inner part 15C of cylindrical portion 15 is present between contact portions 16C of terminal 16 and heat absorption portion 18A1 of heat pipe 18H, and direct contact between contact portions 16C and heat absorption portion 18A1 is prevented by the presence of inner part 15C of cylindrical portion 15.

(Function and Effect)

In the first embodiment, heat absorption portion 18A1 of cooling mechanism 18 is provided at a position opposite to contact portions 16C with respect to inner circumferential surface 15A of cylindrical portion 15 (FIG. 5). Contact portions 16C of terminal 16 generate heat by conduction with counterpart terminal 20. The heat is transferred to heat absorption portion 18A1 through inner circumferential surface 15A of cylindrical portion 15. Cooling mechanism 18 transports the heat transferred to heat absorption portion 18A1 to heat dissipation portion 18A2, and dissipates the heat at heat dissipation portion 18A2.

It is assumed that a configuration as described above is not adopted, and cooling (heat absorption for terminal 16) is performed at the position of base portion 16A of terminal 16, for example. In such a case, most of the heat generated at contact portions 16C of terminal 16 is once transferred to base portion 16A via central portion 16B, and then is absorbed by the cooling mechanism at the position of base portion 16A. In such a configuration, a heat transfer path from a heat generation point (contact portions 16C) to a heat absorption point is longer than that in the first embodiment, and thus a cooling effect acting on the heat generation point is also less than that in the first embodiment.

When compared with such a configuration, the configuration in the first embodiment is provided with heat absorption portion 18A1 of cooling mechanism 18 in the vicinity of contact portions 16C. Accordingly, the configuration in the first embodiment can effectively suppress an increase in the temperature of terminal 16 and peripheral elements thereof, by efficiently absorbing the heat generated at contact portions 16C of terminal 16 and dissipating the heat at heat dissipation portion 18A2.

In some embodiments, the cooling mechanism 18 is provided within cylindrical portion 15 of power connection portion 14A and cooling mechanism 18 provided within cylindrical portion 15 of power connection portion 14B are configured independently of each other, and are arranged to be spaced from each other. Even when cooling mechanism 18 is configured to include a metal member, occurrence of a short circuit between the power connection portion 14A side and the power connection portion 14B side can be suppressed. These two cylindrical portions 15 can also be configured to be cooled by one cooling mechanism 18. In some embodiments, an appropriate insulating structure may be provided between the power connection portion 14A side and the power connection portion 14B side.

As described above, cooling mechanism 18 in the first embodiment includes heat pipe 18H having refrigerant 18B sealed therein. The heat can be transported efficiently by refrigerant 18B, when compared with a case where cooling mechanism 18 is constituted of only a metal member.

As described above, refrigerant 18B in the first embodiment includes a gas-liquid two-phase refrigerant. In the case of the gas-liquid two-phase refrigerant, the heat can be moved according to the phase change of refrigerant 18B, even when heat pipe 18H does not include a motive power source such as a pump for circulating refrigerant 18B. When the motive power source is not used, it can also be contemplated to downsize the entire device. An appropriate level difference may be provided between evaporation portion 18C1 and condensation portion 18C2, according to the type, shape, size and the like of heat pipe 18H. As the gas-liquid two-phase refrigerant, a refrigerant which vaporizes at normal temperature may be used. Even when a refrigerant leak occurs, occurrence of a short circuit or the like can be suppressed. Refrigerant 18B is not limited to a gas-liquid two-phase refrigerant, and a single-phase liquid refrigerant such as water or an anti-freezing solution may be used.

As described above, in the first embodiment, heat pipe 18H has pipe portion 18A forming the enclosed space, and refrigerant 18B accommodated in the enclosed space of pipe portion 18A. By forming the enclosed space of pipe portion 18A such as by welding, a leak of refrigerant 18B out of pipe portion 18A can be suppressed (when compared with a case where an accommodation space for the refrigerant is formed such as by fitting, for example), and thus occurrence of a short circuit or the like due to a leak of refrigerant 18B can also be suppressed.

As described above, in the first embodiment, heat dissipation portion 18A2 of cooling mechanism 18 is arranged to contact electric wire 17 (here, conductor 17B) connected to terminal 16. Electric wire 17 has a heat capacity larger than that of terminal 16, and can appropriately perform heat exchange with heat dissipation portion 18A2. Heat dissipation portion 18A2 of cooling mechanism 18 may be arranged to contact a part different from conductor 17B of electric wire 17, and may be configured to perform heat exchange with the different part.

Second Embodiment

Figure 7:
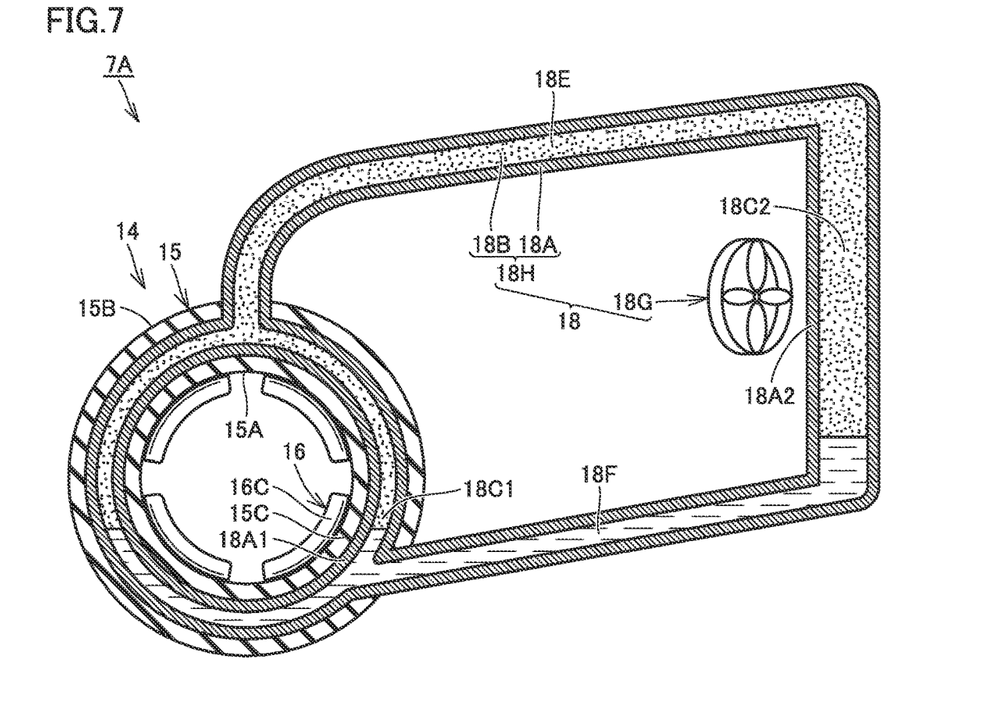
FIG. 7 is a cross sectional view for illustrating a cooling mechanism 18 included in an inlet 7A in a second embodiment.

FIG. 7 is a cross sectional view for illustrating cooling mechanism 18 included in an inlet 7A in a second embodiment. This cross sectional view shows sectional shapes of cylindrical portion 15 and heat pipe 18H obtained when they are virtually cut along a two-dimensional plane orthogonal to the axial direction of cylindrical portion 15.

As shown in FIG. 7, heat pipe 18H is a loop-type pipe having a first flowing portion 18E which allows refrigerant 18B to flow from evaporation portion 18C1 to condensation portion 18C2, and a second flowing portion 18F which allows refrigerant 18B to flow from condensation portion 18C2 to evaporation portion 18C1 without flowing through first flowing portion 18E. Such a configuration can achieve high-speed circulation of the refrigerant, when compared with that in a so-called single pipe-type heat pipe, and can further effectively suppress an increase in the temperature of terminal 16 and peripheral elements thereof.

Cooling mechanism 18 of inlet 7A shown in FIG. 7 further includes a cooling device 18G, in addition to heat pipe 18H. Cooling device 18G cools heat dissipation portion 18A2 of heat pipe 18H by an air cooling method or a liquid cooling method. As the air cooling method, a fan can be adopted, for example. A plurality of heat dissipation fins may be provided on a surface of heat dissipation portion 18A2.

As the liquid cooling method, a circuit through which a liquid circulates by being driven by a pump is prepared, and heat exchange is performed between the circuit and heat dissipation portion 18A2. The liquid cooling method can achieve a higher degree of quietness than that in the air cooling method. These configurations can improve heat dissipation efficiency achieved by cooling mechanism 18, and thus can further effectively suppress an increase in the temperature of terminal 16 and peripheral elements thereof.

It is also possible to combine such a cooling device 18G with the configuration in the first embodiment for implementation.

Third Embodiment

Figure 8:
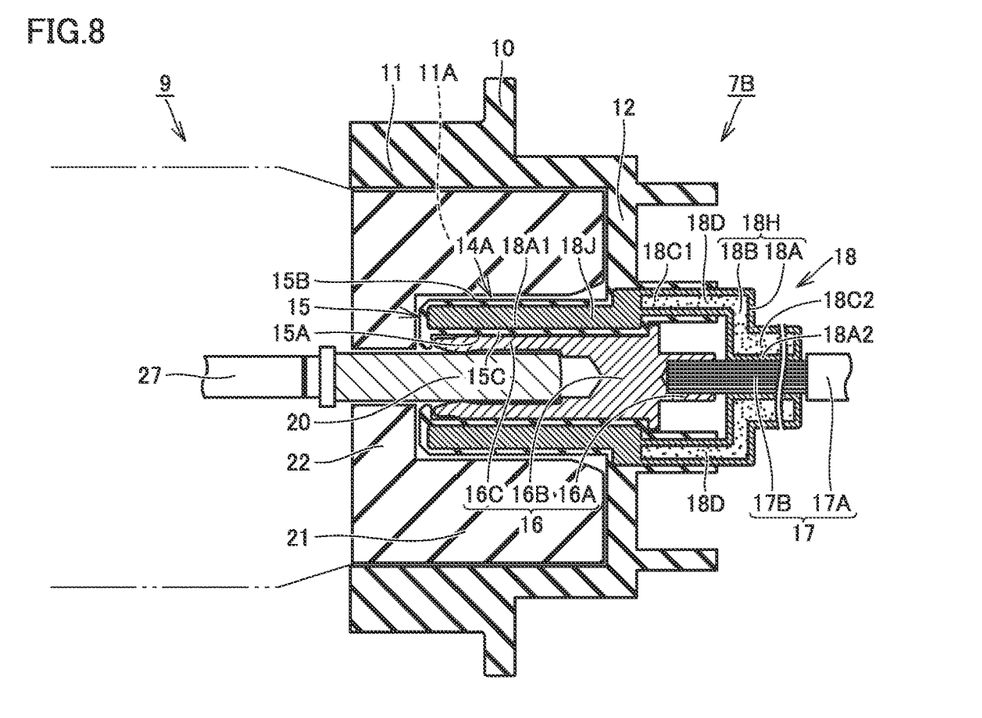
FIG. 8 is a cross sectional view showing an inlet 7B in a third embodiment.

FIG. 8 is a cross sectional view showing an inlet 7B in a third embodiment. The first embodiment and the third embodiment have a commonality in that cooling mechanism 18 includes heat pipe 18H. In the third embodiment, evaporation portion 18C1 of heat pipe 18H is provided at a position apart from heat absorption portion 18A1 of cooling mechanism 18. Cooling mechanism 18 further has a heat transfer portion 18J which connects heat absorption portion 18A1 and evaporation portion 18C1.

Heat transfer portion 18J can be constituted of a metal thin plate, for example. By conduction between counterpart terminal 20 and contact portions 16C, heat is generated at contact portions 16C. The heat is transferred to heat absorption portion 18A1 through inner circumferential surface 15A of cylindrical portion 15. The heat transferred to heat absorption portion 18A1 is transported to evaporation portion 18C1 via heat transfer portion 18J. The heat is transported to heat dissipation portion 18A2 via transportation portion 18D, and is dissipated at heat dissipation portion 18A2.

In the third embodiment, the length of heat pipe 18H is shorter than that in the first embodiment, and metal heat transfer portion 18J is provided. Thus, it can be contemplated to fabricate cooling mechanism 18 easily and inexpensively. Of cooling mechanism 18, all the part embedded within cylindrical portion 15 may be constituted of a metal thin plate to be cylindrical. A solid metal member can exhibit a rigidity higher than that of hollow heat pipe 18H, and such a metal member can function as a reinforcement member (frame member) within cylindrical portion 15.

Fourth Embodiment

Figure 9:
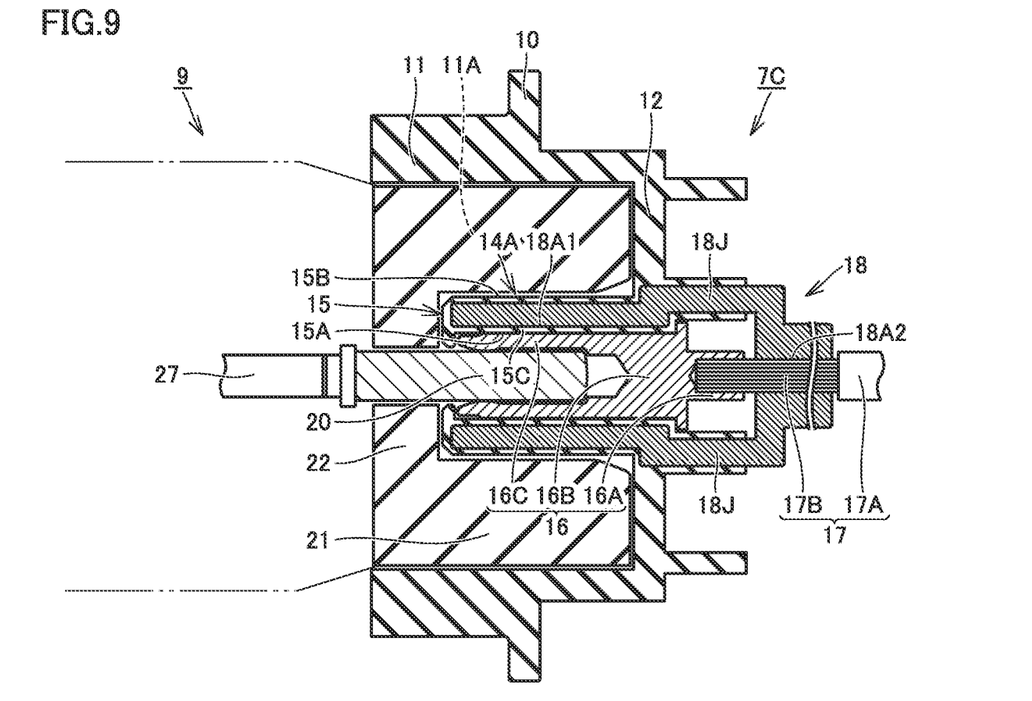
FIG. 9 is a cross sectional view showing an inlet 7C in a fourth embodiment.

FIG. 9 is a cross sectional view showing an inlet 7C in a fourth embodiment. The fourth embodiment is different from the first embodiment in that cooling mechanism 18 does not include heat pipe 18H and is constituted of only a metal member. With such a configuration, it can be contemplated to fabricate cooling mechanism 18 easily and inexpensively, when compared with the case where cooling mechanism 18 includes heat pipe 18H.

Fifth Embodiment

Figure 10:
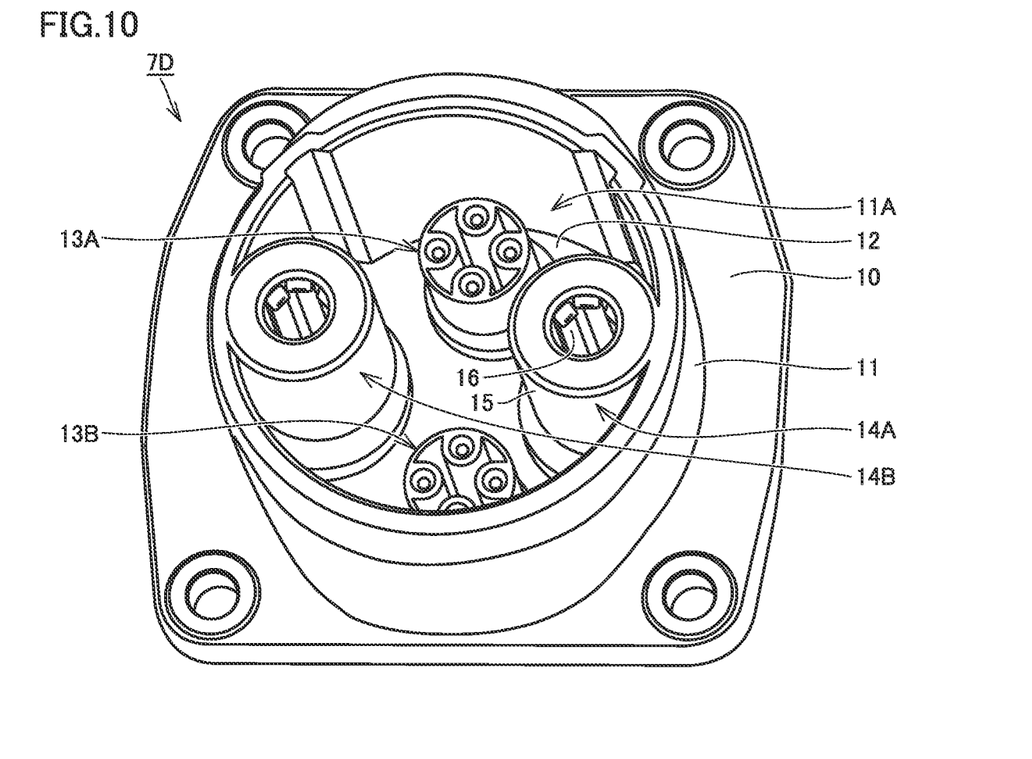
FIG. 10 is a perspective view showing an inlet 7D in a fifth embodiment.

FIG. 10 is a perspective view showing an inlet 7D in a fifth embodiment. The first embodiment and the fifth embodiment have a commonality in that cylindrical portion 15 is provided inside outer circumferential wall 11. In the fifth embodiment, a part of cylindrical portion 15 is connected to outer circumferential wall 11. Cylindrical portion 15 is formed integrally with an inner part of outer circumferential wall 11.

That is, the technical idea of the expression that cylindrical portion 15 is provided inside outer circumferential wall 11 includes both a case where cylindrical portion 15 is provided inside outer circumferential wall 11 at a position apart from outer circumferential wall 11, and a case where a part of cylindrical portion 15 is integrated with the inner part of outer circumferential wall 11. Even when the configuration of the fifth embodiment is adopted, substantially the same function and effect as those in the first embodiment can be obtained.

Variation for First to Fifth Embodiments

The first to fifth embodiments described above have been described based on a case where the technical idea of the present disclosure is applied to inlet 7, 7A, 7B, 7C, 7D for performing fast charging. The technical idea of the present disclosure is also applicable to inlet 6 (FIG. 1) for performing normal charging, and in this case, inlet 6 corresponds to a "connector", and charging connector 8 (FIG. 1) corresponds to a "counterpart connector".

When vehicle 1 (FIG. 1) includes an output connector for taking out electric power stored in vehicle-mounted battery 4 to the outside, the technical idea of the present disclosure is also applicable to such an output connector, and in this case, the output connector corresponds to a "connector", and a member to be connected to the output connector corresponds to a "counterpart connector".

Sixth Embodiment

Figure 11:
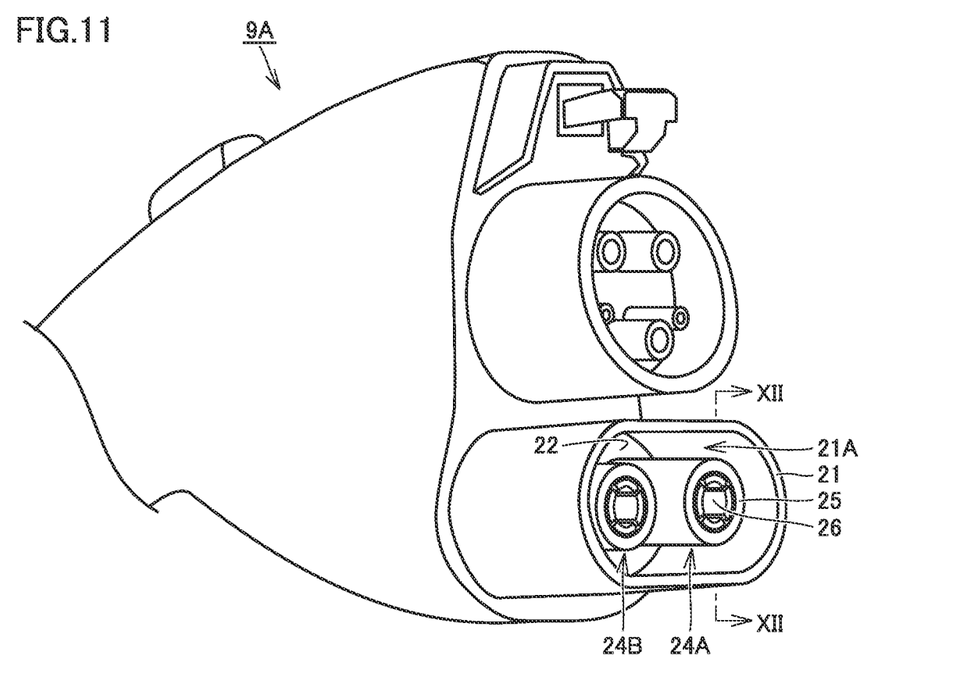
FIG. 11 is a perspective view showing a charging connector 9A in a sixth embodiment.
Figure 12:
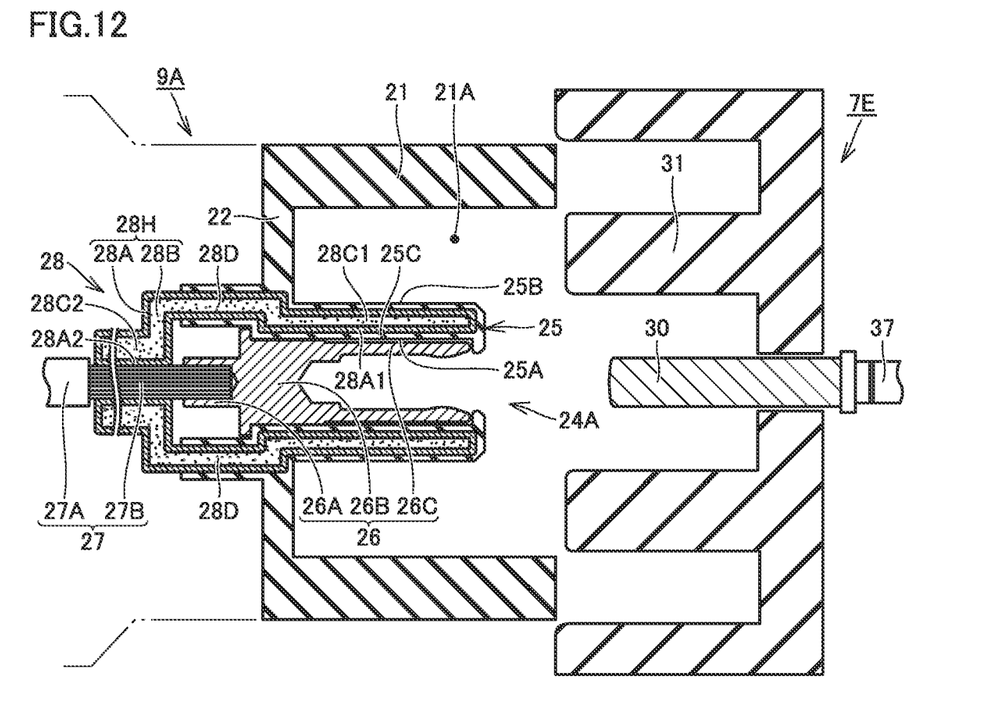
FIG. 12 is a cross sectional view taken along a line XII-XII in FIG. 11 and viewed in a direction indicated by arrows.

FIG. 11 is a perspective view showing a charging connector 9A in a sixth embodiment. FIG. 12 is a cross sectional view taken along a line XII-XII in FIG. 11 and viewed in a direction indicated by arrows. In the sixth embodiment, charging connector 9A corresponds to a "connector". Charging (for example, fast charging) is performed on the vehicle-mounted battery, with charging connector 9A being connected to an inlet 7E. Charging connector 9A includes an outer circumferential wall 21, a bottom wall 22, power connection portions 24A and 24B, and a cooling mechanism 28 (FIG. 12).

Outer circumferential wall 21 has a cylindrical shape. An end portion of outer circumferential wall 21 on one side (the left side in FIG. 12) is closed by bottom wall 22. Outer circumferential wall 21 and bottom wall 22 may be fabricated by integral molding and constitute a single member, or may be fabricated as members separate from one another and then assembled with one another.

Outer circumferential wall 21 forms a recessed portion 21A inside thereof. Inlet 7E (FIG. 12) is to be fitted into recessed portion 21A. Inlet 7E serving as a counterpart connector has a counterpart terminal 30 and an insertion portion 31, and counterpart terminal 30 is electrically connected to the vehicle-mounted battery not shown, via an electric wire 37. Insertion portion 31 is to be fitted into a part of recessed portion 21A located outside a cylindrical portion 25 (described later), and counterpart terminal 30 is to be inserted inside cylindrical portion 25.

Power connection portions 24A and 24B are each provided inside outer circumferential wall 21. Power connection portions 24A and 24B have substantially the same configuration, and power connection portion 24A will be described below. Power connection portion 24A includes cylindrical portion 25 and a terminal 26.

Cylindrical portion 25 is provided at a position inside outer circumferential wall 21, and has an inner circumferential surface 25A and an outer circumferential surface 25B. Cylindrical portion 25 is provided to rise from bottom wall 22, and is configured to have a substantially cylindrical shape to receive counterpart terminal 30 of inlet 7E inside inner circumferential surface 25A. Cylindrical portion 25 may be formed integrally with bottom wall 22, or may be fabricated as a member separate from bottom wall 22 and then fixed to bottom wall 22.

Terminal 26 has a base portion 26A, a central portion 26B, and a plurality of contact portions 26C. Terminal 26 is electrically connected to a charger not shown, via an electric wire 27. A conductor 27B is exposed from a sheath 27A of electric wire 27, and base portion 26A of terminal 26 is connected to conductor 27B such as by a press fit. The plurality of contact portions 26C are provided at a position opposite to base portion 26A with respect to central portion 26B. Central portion 26B supports the plurality of contact portions 26C.

The plurality of contact portions 26C are arranged inside inner circumferential surface 25A of cylindrical portion 25. The plurality of contact portions 26C are each formed as a strip (a long plate), and extend along an axial direction of cylindrical portion 25. The plurality of contact portions 26C have a spacing therebetween, and are arranged side by side along a circumferential direction. Counterpart terminal 30 is inserted into a space surrounded by the plurality of contact portions 26C.

When charging connector 9A is fitted into inlet 7E, contact portions 26C elastically contact counterpart terminal 30 of inlet 7E. The plurality of contact portions 26C are located between inner circumferential surface 25A of cylindrical portion 25 and counterpart terminal 30, and terminal 26 is electrically connected to counterpart terminal 30 when at least one contact portion 26C contacts counterpart terminal 30.

(Cooling Mechanism 28)

Cooling mechanism 28 has a heat absorption portion 28A1 and a heat dissipation portion 28A2. Heat absorption portion 28A1 is provided within cylindrical portion 25, and is located between inner circumferential surface 25A and outer circumferential surface 25B in a radial direction of cylindrical portion 25. Heat absorption portion 28A1 is provided to be located opposite to contact portions 26C with respect to inner circumferential surface 25A of cylindrical portion 25.

By conduction between counterpart terminal 30 and contact portions 26C, heat is generated at contact portions 26C. The heat is transferred to heat absorption portion 28A1 through inner circumferential surface 25A of cylindrical portion 25. Cooling mechanism 28 transports the heat transferred to heat absorption portion 28A1 to heat dissipation portion 28A2, and dissipates the heat at heat dissipation portion 28A2.

Cooling mechanism 28 in the sixth embodiment includes a heat pipe 28H having a refrigerant 28B sealed therein. Refrigerant 28B includes a gas-liquid two-phase refrigerant. Heat pipe 28H (more specifically, an enclosed space provided within heat pipe 28H) has an evaporation portion 28C1 where refrigerant 28B evaporates and a condensation portion 28C2 where refrigerant 28B condenses, and transports the heat according to a phase change of refrigerant 28B.

Heat pipe 28H in the sixth embodiment has a pipe portion 28A and refrigerant 28B. Pipe portion 28A constitutes an outer shell of heat pipe 28H, and is formed from a metal such as copper to be hollow. Pipe portion 28A may be formed from a resin having a high heat conductivity.

Pipe portion 28A has a part embedded within cylindrical portion 25, a part arranged to contact conductor 27B of electric wire 27, and a part connecting between these parts. The part embedded within cylindrical portion 25 has a substantially cylindrical shape as a whole, and an interior space of the embedded part functions as evaporation portion 28C1. Of pipe portion 28A, a part located on a radially inner side of evaporation portion 28C1 constitutes heat absorption portion 28A1 of heat pipe 28H.

Heat absorption portion 28A1 of heat pipe 28H is located opposite to contact portions 26C with respect to inner circumferential surface 25A of cylindrical portion 25 (an inner part 25C of cylindrical portion 25). Inner part 25C of cylindrical portion 25 is present between contact portions 26C of terminal 26 and heat absorption portion 28A1 of heat pipe 28H, and direct contact between contact portions 26C and heat absorption portion 28A1 is prevented by the presence of inner part 25C of cylindrical portion 25.

Of pipe portion 28A, the part arranged to contact conductor 27B of electric wire 27 (contact part) also has a substantially cylindrical shape as a whole. An interior space of the contact part functions as condensation portion 28C2. Of pipe portion 28A, a part located on a radially inner side of condensation portion 28C2 (a part contacting conductor 27B of electric wire 27) constitutes heat dissipation portion 28A2. That is, in the sixth embodiment, heat dissipation portion 28A2 of cooling mechanism 28 is arranged to contact conductor 27B of electric wire 27 connected to terminal 26.

Of an interior space of pipe portion 28A, a part between evaporation portion 28C1 and condensation portion 28C2 functions as a transportation portion 28D. Refrigerant 28B moves between evaporation portion 28C1 and condensation portion 28C2 via transportation portion 28D. In some embodiments, the transportation portion 28D is provided with a member or processing for efficiently moving refrigerant 28B by the action of a capillary phenomenon, such as a mesh or groove-like wick.

As in the case described above with reference to FIG. 6, heat pipe 28H can be formed, for example, by deforming portions of a sheet-like heat pipe to have a cylindrical shape. The sheet-like heat pipe is provided with a cylindrical shape portion forming heat absorption portion 28A1 on an inner surface side (portion corresponding to evaporation portion 28C1), and another cylindrical shape portion forming heat dissipation portion 28A2 on an inner surface side (portion corresponding to condensation portion 28C2). The sheet-like heat pipe has a thickness of 1 mm to 3 mm, for example.

By forming a hollow accommodation portion within cylindrical portion 25 beforehand, heat pipe 28H can be fitted into the accommodation portion. A portion of heat pipe 28H (portion corresponding to evaporation portion 28C1) may be provided within cylindrical portion 25 by insert molding. Although the above portion of heat pipe 28H (portion corresponding to evaporation portion 28C1) is embedded within cylindrical portion 25 in the sixth embodiment, the above portion of heat pipe 28H may be exposed to recessed portion 21A on the outer circumferential surface 25B side of cylindrical portion 25. Also with this configuration, inner part 25C of cylindrical portion 25 is present between contact portions 26C of terminal 26 and heat absorption portion 28A1 of heat pipe 28H, and direct contact between contact portions 26C and heat absorption portion 28A1 is prevented by the presence of inner part 25C of cylindrical portion 25.

(Function and Effect)

Also in the sixth embodiment, heat absorption portion 28A1 of cooling mechanism 28 is provided at a position opposite to contact portions 26C with respect to inner circumferential surface 25A of cylindrical portion 25 (FIG. 12). Contact portions 26C of terminal 26 generate heat by conduction with counterpart terminal 30. The heat is transferred to heat absorption portion 28A1 through inner circumferential surface 25A of cylindrical portion 25. Cooling mechanism 28 transports the heat transferred to heat absorption portion 28A1 to heat dissipation portion 28A2, and dissipates the heat at heat dissipation portion 28A2.

It is assumed that a configuration as described above is not adopted, and cooling (heat absorption for terminal 26) is performed at the position of base portion 26A of terminal 26, for example. In such a case, most of the heat generated at contact portions 26C of terminal 26 is once transferred to base portion 26A via central portion 26B, and then is absorbed by the cooling mechanism at the position of base portion 26A. In such a configuration, a heat transfer path from a heat generation point (contact portions 26C) to a heat absorption point is longer than that in the sixth embodiment, and thus a cooling effect acting on the heat generation point is also less than that in the sixth embodiment. When compared with such a configuration, the configuration in the sixth embodiment is provided with heat absorption portion 28A1 of cooling mechanism 28 in the vicinity of contact portions 26C. Accordingly, the configuration in the sixth embodiment can effectively suppress an increase in the temperature of terminal 26 and peripheral elements thereof, by efficiently absorbing the heat generated at contact portions 26C of terminal 26 and dissipating the heat at heat dissipation portion 28A2.

As has been described above, the technical idea disclosed in the first to fifth embodiments is not limited to be applied to the case where the inlet provided on the vehicle side corresponds to a "connector", and is also applicable to the case where the charging connector corresponds to a "connector".

Variation for First to Sixth Embodiments

The first to sixth embodiments described above have been described based on a connector used to establish electrical connection between a vehicle-mounted battery and a charger provided outside a vehicle. The technical idea of the present disclosure is not limited to be applied to such a configuration, and is also applicable to any configuration of absorbing and dissipating heat generated at a contact portion of a terminal during conduction.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. A connector to be connected to a counterpart connector, comprising:
an outer circumferential wall forming a recessed portion inside thereof, the counterpart connector being to be fitted into the recessed portion;
a cylindrical portion provided inside the outer circumferential wall, having an inner circumferential surface, an outer circumferential surface, and an inner part between the inner circumferential surface and the outer circumferential surface, and configured to receive a counterpart terminal of the counterpart connector inside the inner circumferential surface;
a terminal having a contact portion arranged inside the inner circumferential surface, the terminal being to be electrically connected to the counterpart terminal when the contact portion contacts the counterpart terminal; and
a cooling mechanism having a heat absorption portion and a heat dissipation portion, the heat absorption portion being located between the inner part and the outer circumferential surface in a radial direction of cylindrical portion, provided at a position opposite to the contact portion with respect to the inner circumferential surface and is positioned within the cylindrical portion, the cooling mechanism dissipating heat generated at the contact portion and transferred to the heat absorption portion through the inner circumferential surface, at the heat dissipation portion.

2. The connector according to claim 1, wherein the cooling mechanism includes a heat pipe having a refrigerant sealed therein.

3. The connector according to claim 2, wherein
the refrigerant includes a gas-liquid two-phase refrigerant, and
the heat pipe has an evaporation portion where the refrigerant evaporates and a condensation portion where the refrigerant condenses, and transports the heat according to a phase change of the refrigerant.

4. The connector according to claim 3, wherein the heat pipe is a loop-type pipe having a first flowing portion which allows the refrigerant to flow from the evaporation portion to the condensation portion, and a second flowing portion which allows the refrigerant to flow from the condensation portion to the evaporation portion without flowing through the first flowing portion.

5. The connector according to claim 3, wherein
the evaporation portion is provided at a position apart from the heat absorption portion, and
the cooling mechanism further has a metal heat transfer portion which connects the heat absorption portion and the evaporation portion.

6. The connector according to claim 1, wherein the cooling mechanism is constituted of only a metal member.

7. The connector according to claim 1, wherein the heat dissipation portion is arranged to contact an electric wire connected to the terminal.

8. The connector according to claim 1, wherein the cooling mechanism further includes a cooling device which cools the heat dissipation portion by an air cooling method or a liquid cooling method.

* * * * *